(12) United States Patent
Kaneko et al.

(10) Patent No.: US 7,801,927 B2
(45) Date of Patent: Sep. 21, 2010

(54) VIDEO METADATA CORRECTION APPARATUS AND METHOD

(75) Inventors: Soutaro Kaneko, Kawasaki (JP); Masami Mizutani, Kawasaki (JP); Eishi Morimatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 808 days.

(21) Appl. No.: 11/390,379

(22) Filed: Mar. 28, 2006

(65) Prior Publication Data

US 2007/0130175 A1 Jun. 7, 2007

(30) Foreign Application Priority Data

Dec. 5, 2005 (JP) ............... 2005-350265

(51) Int. Cl.
G06F 7/00 (2006.01)
G06F 17/30 (2006.01)
(52) U.S. Cl. ................................ 707/803; 386/E5.072
(58) Field of Classification Search ................. 707/100, 707/1
See application file for complete search history.

(56) References Cited

U.S. PATENT DOCUMENTS

| 6,950,535 | B2 * | 9/2005 | Sibayama et al. ............ 382/113 |
| 2005/0027745 | A1 * | 2/2005 | Sohma et al. ............. 707/104.1 |
| 2005/0159916 | A1 | 7/2005 | Anabuki |

FOREIGN PATENT DOCUMENTS

| JP | 10-042282 | 2/1998 |
| JP | 2000-331019 | 11/2000 |
| JP | 2001-309217 A | 11/2001 |
| JP | 2004-213355 A | 7/2004 |

OTHER PUBLICATIONS

JPO (Japan Patent Office), Office Action mailed by the Japan Patent Office on Apr. 20, 2010, in connection with corresponding JP patent application No. 2005-350265. A partial English language translation of the Office Action is attached for the Examiner's information.

* cited by examiner

*Primary Examiner*—James Trujillo
*Assistant Examiner*—Amresh Singh
(74) *Attorney, Agent, or Firm*—Fujitsu Patent Center (57) ABSTRACT

This invention is to provide a technique for properly correcting video metadata related to and synchronized with the video. This video metadata correction apparatus includes: a section identification unit that identifies a section including incorrect video metadata based on information concerning video metadata in a first video metadata storage for storing the information concerning the video metadata as sensor information synchronized with video and a first video feature value, which correlates with the information concerning the video metadata and is extracted from the video; and a corrector that corrects the video metadata in the identified section based on the first video feature value or a second video feature value, which correlates with the information concerning the video metadata and is extracted from the video. In this manner, only an incorrectly measured part can be corrected in an effective manner.

10 Claims, 6 Drawing Sheets

| TIME | t1 | t2 | t3 | t4 | .... |
|---|---|---|---|---|---|
| AZIMUTH ANGLE (DEGREES) | 89 | 125 | 93 | 71 | |

| TIME | t1 | t2 | t3 | t4 |
|---|---|---|---|---|
| AZIMUTH ANGLE (DEGREES) | 89 | 125 | 93 | 71 |
| AZIMUTH ANGLE DIFFERENCE (DEGREES) | – | 36 | -32 | -22 |

| TIME | t1 | t2 | t3 | t4 |
|---|---|---|---|---|
| VIDEO HORIZONTAL DISTANCE | — | -5 | -5 | -5 |

| TIME | t1 | t2 | t3 | t4 |
|---|---|---|---|---|
| VIDEO HORIZONTAL DISTANCE | — | -5 | -5 | -5 |
| AZIMUTH ANGLE BEFORE CORRECTION (DEGREES) | 89 | 125 | 93 | 71 |
| AZIMUTH ANGLE AFTER CORRECTION (DEGREES) | 89 | 83 | 77 | 71 |

FIG.13

| TIME | t1 | t2 | t3 | t4 |
|---|---|---|---|---|
| AZIMUTH ANGLE (DEGREES) | 89 | 83 | 77 | 71 |

FIG.14

VIDEO METADATA CORRECTION APPARATUS AND METHOD

TECHNICAL FIELD OF THE INVENTION

The present invention relates to a technique to correct metadata related to and synchronized with video.

BACKGROUND OF THE INVENTION

With the prevalence of digital video recording apparatuses, a technique for deriving information included in a video more effectively by recording environmental information obtained from various sensors, synchronized with the video.

For example, the position and azimuth angle information of a digital video recording apparatus (for example, a video camera) are recorded together with video and the recorded position and azimuth angle are checked against geographic information at retrieval, whereby the information of an object in the video can be extracted. This enables more detailed construction recording by replacing a construction photograph for the purpose of supervising a construction site with a video image with the video recording position and azimuth angle. In addition, in a movable body such as a car, a driving recorder for recording driving states is sometimes used to record a position, an azimuth angle, and the like together with the video in order to use them for the cause unfolding at the time of an accident. Furthermore, as for a portable terminal such as a cellular phone, the combination of the video and a position and/or an azimuth angle is effective when a person carrying the portable terminal records the history of behavior with the video or uses it as a human navigation system.

The digital video recording apparatus for realizing the aforementioned system can be accomplished by combining a global positioning system (GPS) with an electronic compass with a digital video camera. In addition, the conventional technique for imparting metadata such as the position or azimuth angle to the video is disclosed, for example, in JP-A-H10-42282 and JP-A-2000-331019.

JP-A-H-10-42282 discloses a technique for imparting a viewpoint and an azimuth angle obtained by using a gyro sensor, a GPS sensor, or the like as metadata at the time of the video recording in a system for presenting image generated by superimposing the geographic information onto the shot image.

Moreover, JP-A-2000-331019 discloses a technique for automatically imparting an index to a landscape image. More specifically, an input control processor inputs video information data of the pertinent place from a video information database. A reference model calculation processor generates a reference model from geographic information using camera parameters with some flexibility when shooting the previous frame. An image matching processor extracts outline information from the image of a processed image frame and compares it with the reference model, thereby selects the most appropriate model and then calculates camera parameters. An indexing processor calculates an object area in the frame by projecting geographic information to an image coordinate system by using the camera parameters and then imparts attribute data to constitute the object, to the object. A texture extraction processor obtains texture information on the object as geographic information by obtaining the image of the calculated object. This enables presenting what is in the image or retrieving a desired image by automatically indexing the object in the frame by using the geographic information for a time-series landscape image accumulated or acquired in real time.

Various sensors, however, may indicate incorrect values due to an operating environment or the like at the time of recording in some cases. For example, 2-axis geomagnetic electronic compass as an azimuth sensor, which is widely used at present, is influenced by earth magnetism in the vertical direction. Therefore, in some cases, it may indicate incorrect azimuth angle information due to a vertical motion of a camera. Moreover, a GPS for measuring position information sometimes causes an error in measurement position due to an occurrence of a multipath or the like. When such sensor information is incorrect at presenting the video, information on the video cannot be correctly presented to a user, thereby giving rise to the confusion problematically. This problem is not considered in the first conventional technique.

Moreover, the second conventional technique described above has a problem in that it denies the use of sensor information and that it is excessively dependent on information obtained from the video. Originally, various sensors themselves exist to measure their target, and their accuracies are higher than information obtained from video. In other words, imparting video metadata by sensors is basically effective, while errors in the video metadata have a serious influence on the service performance based on the video metadata. In the real world, it is hard to always record correct values by sensors and therefore there is a need for a technique to detect incorrectly recorded parts and to correct the errors.

SUMMARY OF THE INVENTION

Therefore, an object of the present invention is to provide a technique for properly correcting video metadata related to and synchronized with the video.

A video metadata correction apparatus according to the present invention, includes: a section identification unit that identifies a section including incorrect video metadata based on information concerning video metadata in a first video metadata storage for storing the information (for example, video metadata or the amount of change of video metadata) concerning the video metadata as sensor information synchronized with video and a first video feature value, which correlates with the information concerning the video metadata and is extracted from the video; and a corrector that corrects the video metadata in the identified section based on the first video feature value or a second video feature value, which correlates with the information concerning the video metadata and is extracted from the video, and stores the corrected video metadata into a second video metadata storage. In this manner, the section determined to include the incorrect video metadata is corrected by using the first or second feature value as described above, whereby only an incorrectly measured part can be corrected in an effective manner while utilizing the measuring accuracy of the sensors themselves for obtaining the video metadata.

The aforementioned section identification unit may include a unit that extracts a feature value correlating with the information concerning the video metadata and according to change of the video with respect to time as the first video feature value from time-series data of the video. This enables appropriate identification of the section to be corrected.

Furthermore, the aforementioned corrector may include a unit that calculates a correction amount of the video metadata, which is proportional to an amount of change of the first video feature value or the second video feature value. Thus, this generation of the correction amount of the video metadata enables generation of the video metadata according to the change of the video.

Furthermore, the aforementioned corrector may include a unit that calculates the correction amount of the video metadata, which is proportional to the amount of change of the first video feature value or the second video feature value and used to continuously connect the identified section and its preceding and following sections or a correction section and its preceding and following sections, wherein the correction section includes the identified section and at least its preceding or following subsection. This enables the video metadata to vary more naturally according to the change of the video.

The video metadata correction apparatus may be composed of a computer and a program executed by the computer: the program is stored in a storage medium or storage device such as a flexible disk, a CD-ROM, a magneto-optical disk, a semiconductor memory, a hard disk drive, or the like. Moreover, it may be distributed as digital signals over a network or the like. An intermediate processing result is temporarily stored in a storage device such as a main memory.

BRIEF DESCRIPTION OF THE DRAWINGS

The aforementioned and other objects, features and advantages of the present invention will become apparent from the following detailed description when taken with the accompanying drawing in which.

DETAILED DESCRIPTION OF THE PREFERRED EMBODIMENTS

Figure 1:
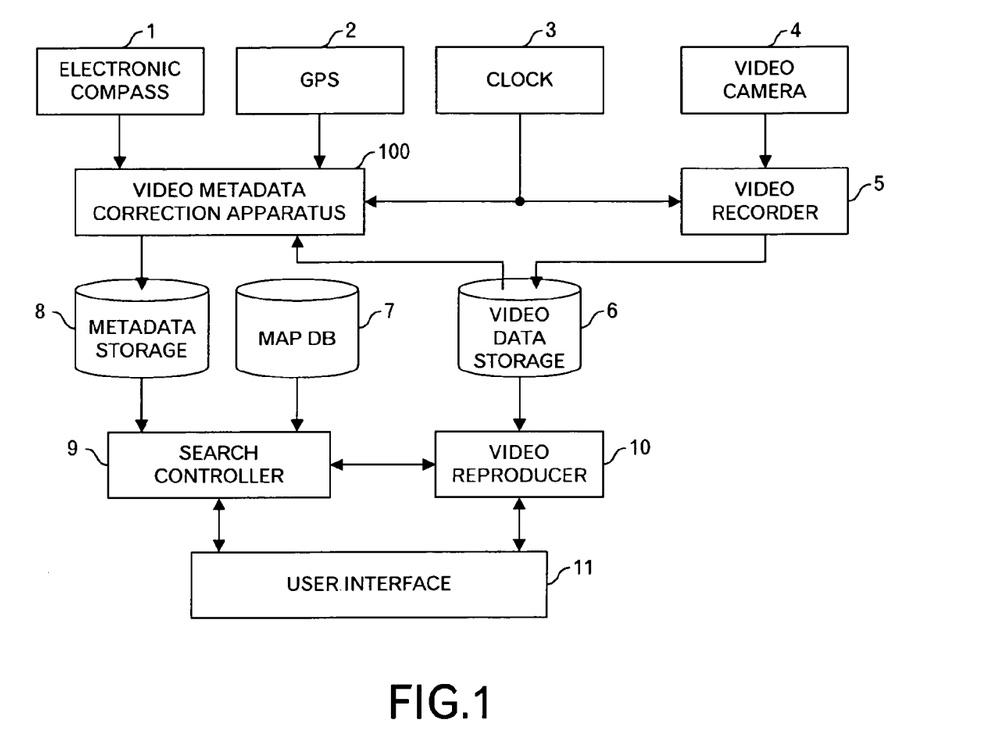
FIG. 1 is an overall functional block diagram according to an embodiment of the present invention.

The preferred embodiment of an object search system using a video metadata correction apparatus for correcting sensor information, namely video metadata (hereinafter, simply referred to as metadata in some cases) will be described hereinafter with reference to FIG. 1. The object search system includes an electronic compass 1 as a sensor for measuring an azimuth angle, a GPS 2 as a sensor for measuring a position, a clock 3 for outputting time data, a video camera 4 for shooting a moving image, a video recorder 5 for recording video data shot by the video camera 4 together with the time data from the clock 3, a video data storage 6 for storing video data with time, which is an output of the video recorder 5, a map database (DB) 7 for storing data of map elements such as buildings on a map and enabling to retrieve the map element according to the position and azimuth angle data, a video metadata correction apparatus 100 for correcting video metadata from the electronic compass 1 and the GPS 2, if necessary, a metadata storage 8 for storing various metadata, which is an output of the video metadata correction apparatus 100, a user interface 11 including an input-output unit, which is a user interface for a user, a video reproducer 10 for outputting the video data stored in the video data storage 6 to the user interface 11 according to an instruction or the like input via the user interface 11, and a search controller 9 for searching the metadata storage 8 on the basis of time data (recording time) of the video output to the user interface 11 by the video reproducer 10 according to the instruction or the like input via the user interface 11, further searching the map DB 7 according to the extracted metadata to obtain data of the map elements, and outputting the data to the user interface 11.

Subsequently, the operation of the object search system shown in FIG. 1 will be described briefly below. For example, a user checks the video and its recording time output from the video reproducer 10 via the user interface 11. When searching for an object in the video, the recording time when the object appears is input as a search request to the search controller 9 via the user interface 11. This kind of search request may be automatically generated based on the time data, which is output as needed from the video reproducer 10 to the search controller 9.

Thereupon, the search controller 9 extracts the position and azimuth angle information corresponding to the input recording time from the metadata storage 8 and searches the map DB 7 by the position and azimuth angle, thereby the search result including the corresponding map element data is output to the user via the user interface 11.

Figure 2:
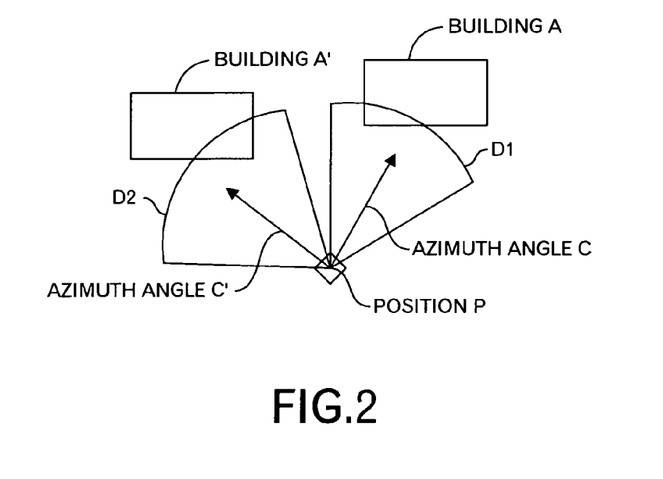
FIG. 2 is a diagram for explaining how to use an azimuth angle.

With reference to FIG. 2, the concept of searching the map DB 7 by means of the search controller 9 will be described below. In FIG. 2, for example, it is assumed that a shooting was carried out in a range where the central angle of a sector D1 is defined as a viewing angle. On this occasion, the map DB 7 is searched with metadata of a position P that is a viewpoint and metadata of an azimuth angle C that is a view direction, an object is identified as a building A, and then data of the building A is presented to the user via the user interface 11. Incidentally, it may be determined in some cases whether another building is hidden, by using the map DB 7 containing the heights of the buildings and the like. When there is a plurality of buildings on the screen, another building may be identified on the basis of a displacement from the azimuth angle C.

Naturally, when sensor information is incorrect, accurate data of the object cannot be presented by this object search system. For example, when the original azimuth angle C is incorrectly recorded as an azimuth angle C' for some reason, it is mistakenly determined that the shooting is carried out in a range where the central angle of a sector D2 is defined as a viewing angle, and therefore a building A' is identified, though the actual object is the building A. Thus, an error occurs in the search result.

On the other hand, the electronic compass 1 in this embodiment is a 2-axis geomagnetic electronic compass and therefore it is susceptible to error in the azimuth angle caused by an influence of the earth magnetism in the vertical direction. More specifically, when a camera work, which is often carried out, is done at shooting with the camera being tilted in the vertical direction like one for looking up to a building, an error occurs in measurement of the azimuth angle.

Therefore, the metadata is corrected by carrying out a processing as described below using the video metadata correction apparatus 100. The following describes an example of correction of an azimuth angle.

Figure 3:
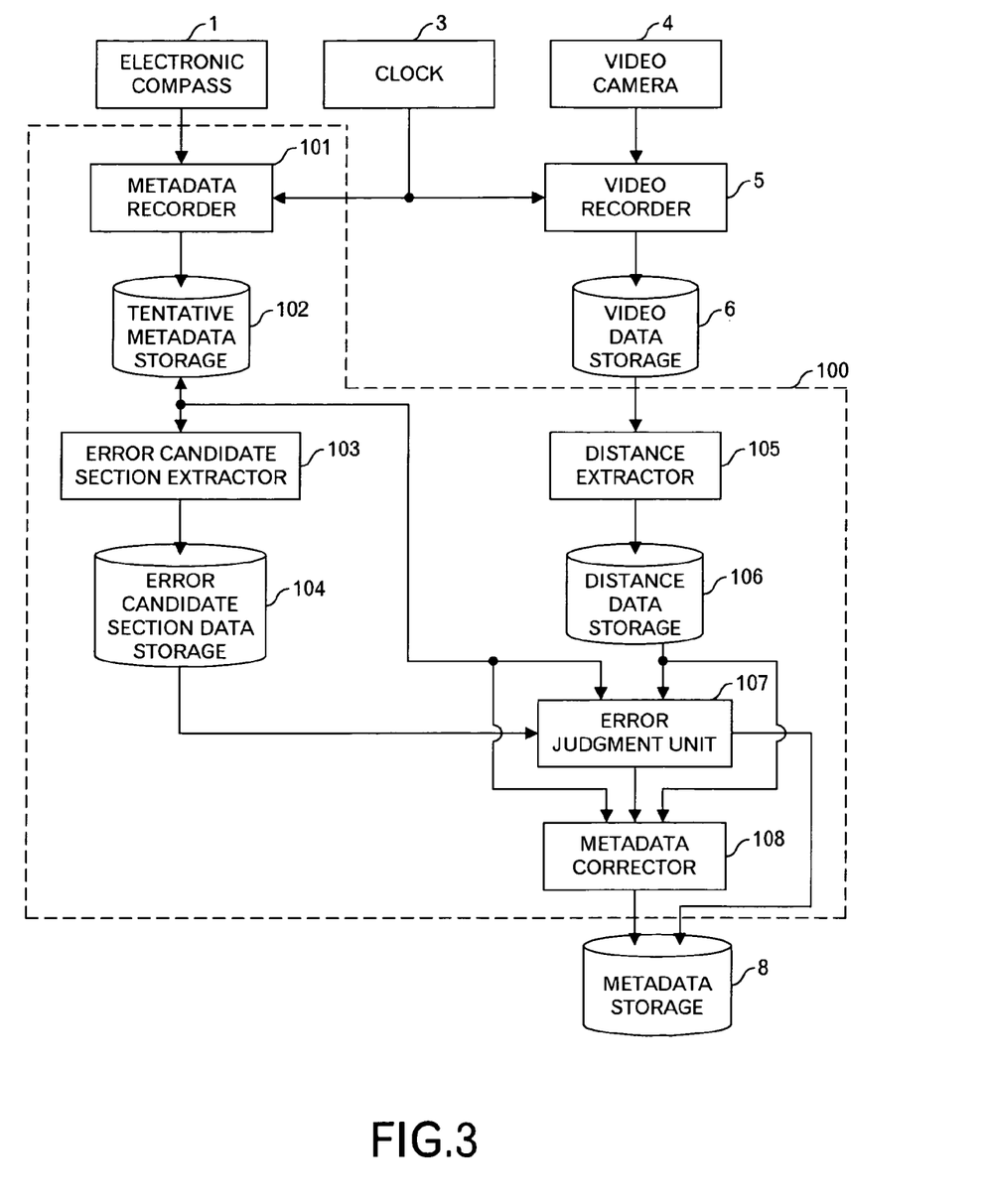
FIG. 3 is a functional block diagram related to a video metadata correction apparatus according to the embodiment of the present invention.

FIG. 3 shows a functional block diagram of the video metadata correction apparatus 100 and so forth. Incidentally, FIG. 3 also shows a functional block shown in FIG. 1 and related to the video metadata correction apparatus 100. In addition, the video metadata correction apparatus 100 associates an output from the GPS 2 with time data from the clock 3 and stores them into the metadata storage 8. However, this portion is omitted in FIG. 3.

The video metadata correction apparatus 100 includes a tentative metadata storage 102 for storing metadata and the like before correction, a metadata recorder 101 for storing azimuth angle data output from the electronic compass 1 in association with time data from the clock 3 into the tentative metadata storage 102, an error candidate section extractor 103 for extracting an error candidate section or error candidate sections by using data stored in the tentative metadata storage 102, an error candidate section data storage 104 for storing data of the error candidate section extracted by the error candidate section extractor 103, a distance extractor 105 for extracting a distance and the like of an object from video data stored in the video data storage 6, a distance data storage 106 for storing data such as the distance and the like extracted by the distance extractor 105, an error judgment unit 107 for carrying out a processing of identifying an error section or error sections where an error occurs among the error candidate sections by using data stored in the tentative metadata storage 102, the error candidate section data storage 104, and the distance data storage 106, and a metadata corrector 108 for correcting metadata of the error section or the like identified by the error judgment unit 107 by using data stored in the tentative metadata storage 102 and the distance data storage 106. Incidentally, in principle, the metadata storage 8 stores data from the tentative metadata storage 102 processed by the error judgment unit 107 for sections that do not fall into the error sections and metadata corrected by the metadata corrector 108 for sections that fall into the error sections.

Subsequently, the processing of the video metadata correction apparatus 100 and so forth shown in FIG. 3 will now be described with reference to FIGS. 4 to 14. First, the metadata recorder 101 obtains azimuth angle data from the electronic compass 1, for example, periodically (for example, at 1-second intervals) and stores it together with the current time from the clock 3 into the tentative metadata storage 102. The video recorder 5 obtains video data from the video camera 4 periodically and stores it together with the current time from the clock 3 into the video data storage 6 (step S1). Incidentally, the video data does not need to be necessarily obtained at regular intervals as long as the video is synchronized with metadata.

Figure 5:
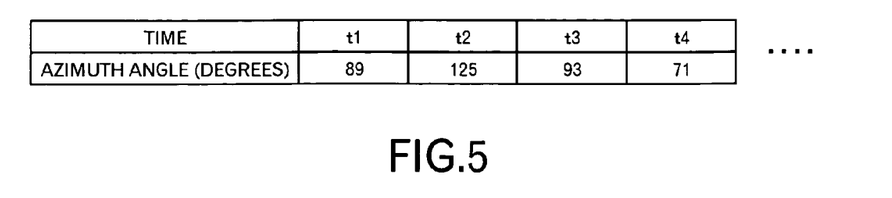
FIG. 5 is a diagram showing an example of data stored in a tentative metadata storage.
Figure 6:
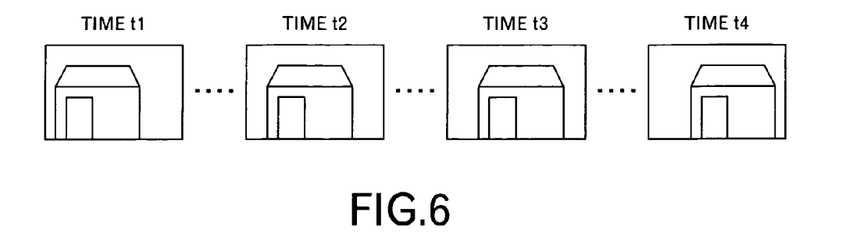
FIG. 6 is a diagram showing an example of data stored in a video data storage.

Here, for example, data as shown in FIG. 5 is stored into the tentative metadata storage 102. In the example shown in FIG. 5, azimuth angle values (degrees) has been registered in association with the time t1, t2, t3, and t4, respectively. In addition, for example, data as shown in FIG. 6 is stored into the video data storage 6. In the example shown in FIG. 6, frame data is registered in association with the time t1, t2, t3, and t4, respectively. Incidentally, video data not associated with time data may exist between time t1 and time t2, for example.

Figure 7:
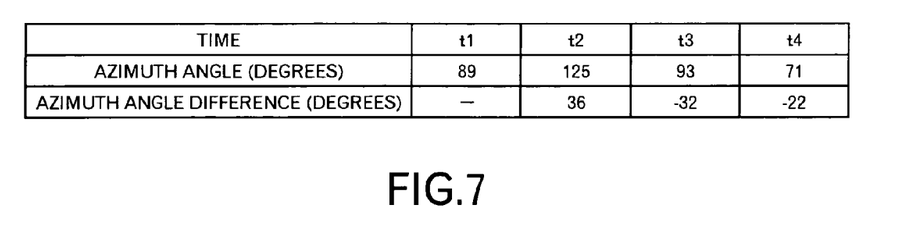
FIG. 7 is a diagram showing an example of data stored in the tentative metadata storage.

Subsequently, the error candidate section extractor 103 calculates a differential value of the azimuth angles and stores it, for example, into the tentative metadata storage 102 (step S3). More specifically, it calculates a difference between the azimuth angle value at time t2 and the azimuth angle value at time t1, calculates a difference between the azimuth angle value at time t3 and the azimuth angle value at time t2, and repeats such calculation in the same manner. Upon execution of the step S3, for example, data as shown in FIG. 7 is stored, for example, into the tentative metadata storage 102. Specifically, an azimuth angle (degrees) and a differential value of the azimuth angles (degrees) are stored for each time. Incidentally, the difference between the azimuth angle value at time t2 and the azimuth angle value at time t1 is registered as the value of the azimuth angle difference at time t2. The subsequent differences are calculated and registered in the same manner.

The error candidate section extractor 103 extracts an error candidate section or error candidate sections on the basis of the time-series data of the azimuth angle difference, which is stored in the tentative metadata storage 102 (step S5). A typical example of the error candidate section is described below with reference to FIG. 8.

Figure 8:
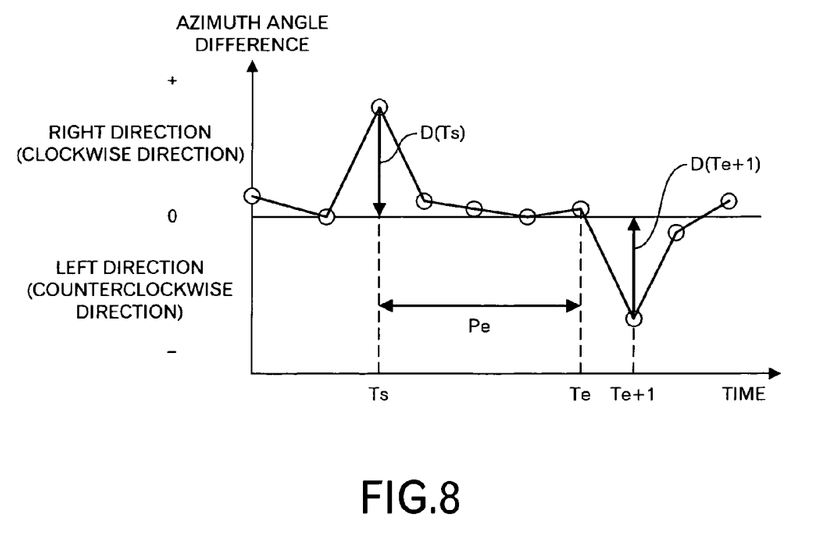
FIG. 8 is a diagram for explaining an error section.

FIG. 8 is a graph showing the change of the azimuth angle difference with respect to time, which is calculated from the azimuth angle output from the electronic compass 1, when tilting the video camera 4 with the electronic compass 1 upward, keeping it stationary for a while, and then returning the tilt of the video camera 4 to the original angle. The abscissa axis represents the time and the ordinate axis represents the azimuth angle difference. Incidentally, a positive azimuth angle difference indicates that the video camera 4 is rotated to the right (namely in clockwise direction). On the other hand, a negative azimuth angle difference indicates that the video camera 4 is rotated to the left (namely in counterclockwise direction). In this manner, the video camera 4 is just moved into the vertical direction and the horizontal azimuth angle of the electronic compass 1 does not change almost at all in this situation. However, due to the characteristics of the electronic compass 1 described above, it may indicate a great difference value of the azimuth angles. In other words, the azimuth angle difference D(Ts)=d is measured at the error start time Ts. Thereafter, while the video camera 4 stands still (the section Pe from time Ts+1 to time Te), the difference value of the azimuth angles remains around zero. Furthermore, when the tilt of the video camera 4 is returned to the original angle (time Te+1), the azimuth angle returns to the original one. Therefore, in order to return from the previous incorrect azimuth angle, there appears an azimuth angle difference of d' (=D(Te+1), which approximately equals −d) whose magnitude is close to, but whose sign is opposite to the azimuth angle difference d, which appears in the first error. At this time when the azimuth angle difference d' appears, the azimuth angle has already returned to the correct one. Thus, the error section Pe is defined to range from the time Ts to the time Te and the azimuth angle difference d' is assumed to appear at the time Te+1. In this manner, the error candidate section extractor 103 searches for a time-series change of the azimuth angle difference, which appears during the time period, for example, from Ts to Te+1, identifies the time period from Ts to Te as an error candidate section, and stores data of the error candidate section (for example, start and end time data) into the error candidate section data storage 104. In addition, when there is a case where another error occurs, the error candidate section extractor 103 extracts an error candidate section corresponding to the case where the error concerned occurs.

Figure 4:
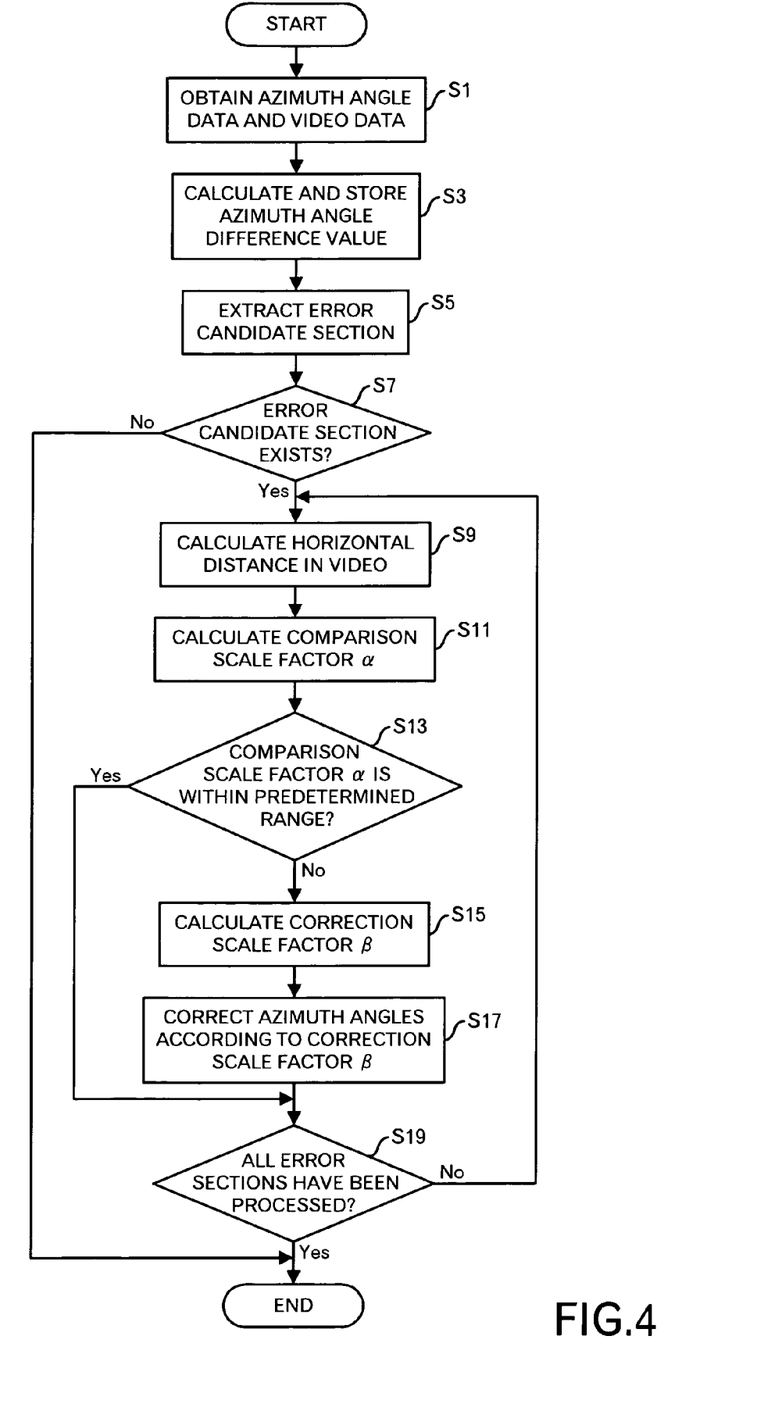
FIG. 4 is a diagram showing a processing flow according to the embodiment of the present invention.

Then, the error judgment unit 107 judges whether there is an error candidate section according to whether data of the error candidate section is registered in the error candidate section data storage 104 (step S7). When there is no error candidate section, the processing terminates. On the other hand, when there is at least one error candidate section, the error judgment unit 107 identifies one error candidate section.

Subsequently, the distance extractor 105 calculates a horizontal distance in the video by using the time-series data of the video stored in the video data storage 6 and stores it into the distance data storage 106 (step S9).

Figure 9A:
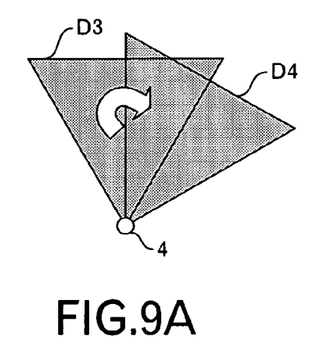
FIG. 9A and FIG. 9B are diagrams showing a relation between the rotation of a video camera and the change of the video.
Figure 9B:
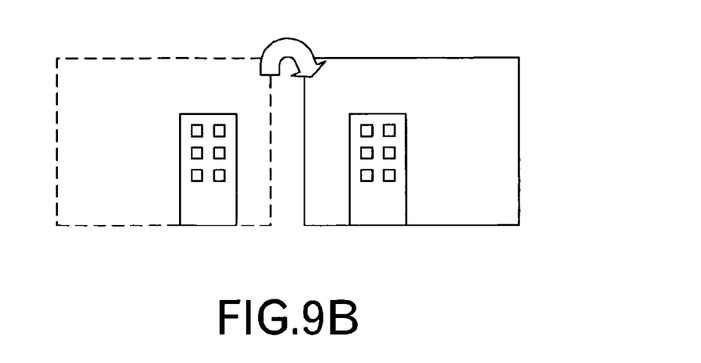

The horizontal distance in the video is a feature value correlating with the azimuth angle difference. For example, when the video camera 4 is rotated to the right while shooting as shown in FIG. 9A, azimuth angle data before and after the rotation are output from the electronic compass 1 attached to the video camera 4 and thereby the azimuth angle difference corresponding to the rotation angle is calculated. Furthermore, the shooting range shifts from D3 to D4 and therefore the object (for example, a building) in the video of the video camera 4 generally moves to the left as shown in FIG. 9B. In addition, the difference value of the azimuth angles is relatively large when the video camera 4 rotates at a large angle, and the distance of the object in the video also increases in proportion as this. In this manner, it can be said that the video horizontal distance correlates with the azimuth angle difference. The horizontal distance between frames, which is a feature value to be extracted by the distance extractor 105, can be calculated by an existing global motion affine parameter calculation technique. Particularly among them, it is more effective to use an existing technology that enables the distance of the background by separating the background from the foreground.

Figure 10:
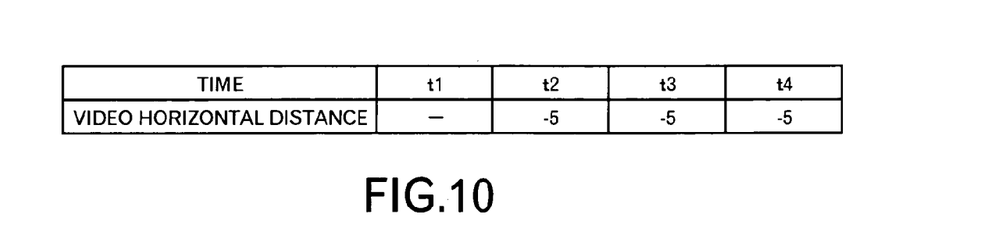
FIG. 10 is a diagram showing an example of data stored in a distance data storage.

When the video data as shown in FIG. 6 is stored in the video data storage 6, the object (building) in the video moves to the right, for example, in units of five pixels, and the data extracted by the distance extractor 105 and stored in the distance data storage 106 is, for example, data as shown in FIG. 10. The movement in the right direction indicates a rotation in the left direction: when the rotation to the right is positive, the object in the video moves by −5 pixels. In the example shown in FIG. 10, the horizontal distance values of the video are registered in association with the time t2, t3, and t4, respectively. The video horizontal distance at the time t 2 is a difference between the position at the time t2 and the position at the time t1, and subsequently each difference is calculated and registered in the same manner.

Furthermore, the error judgment unit 107 calculates a comparison scale factor α according to a method described below by using data stored in the tentative metadata storage 102 (FIG. 7), data stored in the distance data storage 106 (FIG. 10), and data stored in the error candidate section data storage 104 and stores the calculated comparison scale factor α into the storage device such as a main memory (step S11). Specifically, the comparison scale factor α is defined by the following expression:

$$\alpha = \arg\min_{a} \sum_{t=T_s}^{T_e+1} |D(t) - aX(t)|^2 \quad (1)$$

Where a is a scale factor under the calculation, t is time, Ts is a start time of the error candidate section, Te is an end time of the error candidate section, D(t) is an azimuth angle difference at time t, and X(t) is a video horizontal distance (actually, an average value) from time t−1 to time t. Moreover, arg represents an argument a for a following function. Incidentally, if C(t) is defined as an azimuth angle at the time t, the expression D(t)=C(t)−C(t−1) is satisfied.

More specifically, in comparison between the azimuth angle difference and the video horizontal distance at an identical time, the video horizontal distance is multiplied by the scale factor a and then it is compared with the azimuth angle difference. When the scale factor a is determined so that a value calculated by accumulating, during the error candidate section, the square value of the absolute value of the difference (namely residual) between them as the comparison result is minimized, the scale factor a at that time becomes a comparison scale factor α.

Figure 11:
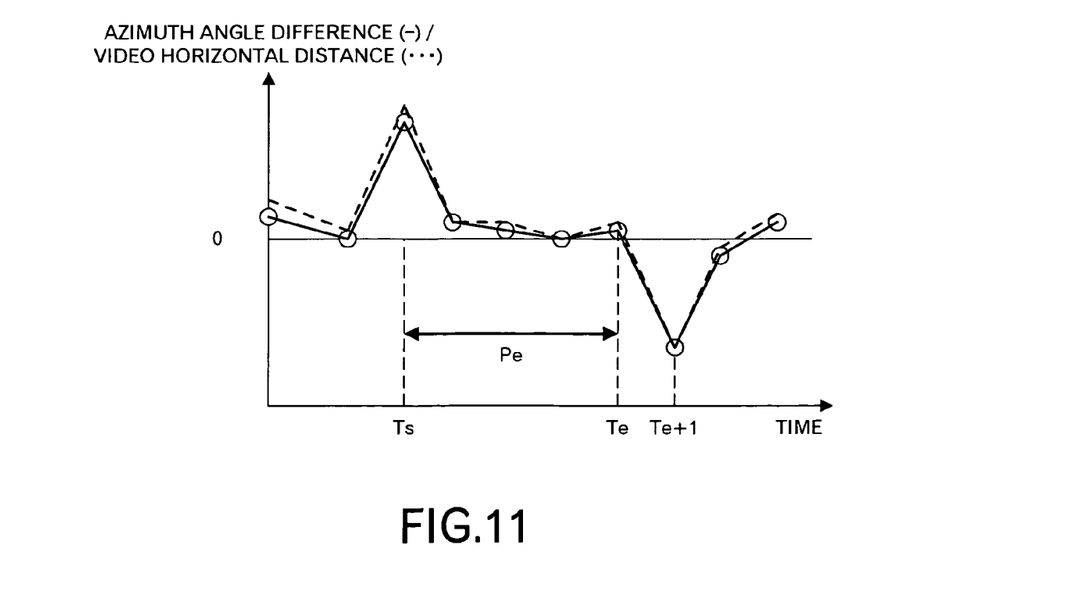
FIG. 11 is a diagram for explaining a comparison scale factor α.

More specifically, when the video horizontal distance is scaled using the same scale factor a at each time point and the decrease of the absolute value of the residual from the azimuth angle difference is enabled, it is possible to determine that the error candidate section is not any error section, though it looks like an error section, because the azimuth angle difference correlates with the video horizontal distance as described above. This example will be described with reference to FIG. 11. The abscissa axis represents time, while the ordinate axis represents the azimuth angle difference by a solid line and the video horizontal distance by a dashed line. When the video horizontal distance adjusted using an appropriate scale factor α is plotted at each time point, it can be represented by the dashed line, which is substantially the same as the change of the azimuth angle difference with respect to time, which is represented by the solid line.

When the error candidate section is actually an error section, however, the video horizontal distance does not correlate with the azimuth angle difference and therefore the scale factor α may be calculated as zero in some cases. Actually, there is a case where the video horizontal distance is substantially zero and is adapted to the azimuth angle difference by forcible scaling. Therefore, when α is less than zero or α is out of a predetermined range (a range between the lower limit $A_{low}$ and the upper limit $A_{High}$), the error candidate section is determined to be exactly an error section. The lower limit $A_{low}$ and the upper limit $A_{High}$ can be obtained from an experiment.

While the error candidate section is defined as the a calculation base period in the above, sections including predetermined sections preceding and following the error candidate section may be defined as the calculation base period. Note that, however, such sections cannot include another error candidate section.

The reason why α varies with each error candidate section is that the horizontal distance corresponding to the azimuth angle difference at each scene depends upon the distance from the background being shot or the like. On the other hand, in the local time, there is no problem to think that the azimuth angle difference correlates with the horizontal distance and therefore a is uniquely determined within an error candidate section.

Having already been described above, thereafter the error judgment unit 107 determines whether or not the calculated comparison scale factor α is within a predetermined range (within the range between the lower limit $A_{Low}$ and the upper limit $A_{High}$) (step S13). When the comparison scale factor α is determined to be within the predetermined range, the error candidate section is considered not to be actually an error section and the processing progresses to step S19. Incidentally, the metadata in the section determined to be an error candidate section is stored into the metadata storage 8.

On the other hand, when the comparison scale factor α is determined to be out of the predetermined range, the error judgment unit 107 identifies the error candidate section as an error section and instructs the metadata corrector 108 to carry out a processing. In the examples shown in FIG. 7 and FIG. 10, α=0 and therefore a of the error candidate section is determined to be out of the predetermined range. The metadata corrector 108 calculates a correction scale factor β according to the method described below by using the data stored in the tentative metadata storage 102 (FIG. 7) and the data stored in the distance data storage 106 (FIG. 10), and stores the correction scale factor β into a storage device such as, for example, a main memory (step S15). More specifically, the correction scale factor β is defined as follows:

$$\beta = \arg\min_b |Q(b)| \quad (2)$$

$$Q(b) = C(T_s - 1) - C(T_e + 1) + b \sum_{t=T_s}^{T_e+1} X(t) \quad (3)$$

If Q(β)=0, the expression (3) is transformed and thereby the following expression is satisfied:

$$C(T_s - 1) + \beta \sum_{t=T_s}^{T_e+1} X(t) = C(T_e + 1) \quad (4)$$

As described above, the argument b minimizing |Q(b)| is defined as the correction scale factor β. Therefore, Q(β)=0 is preferable. In addition, Q(b) indicates a residual obtained by adjusting the azimuth angle in the error section with the video horizontal distance. More specifically, it is a function to adjust the difference between the azimuth angle C(Ts−1) immediately preceding the error section and the azimuth angle C(Te+1) immediately following the error section by using a value calculated by accumulating the video horizontal distance X(t) multiplied by the scale factor b during the error section.

Figure 12A:
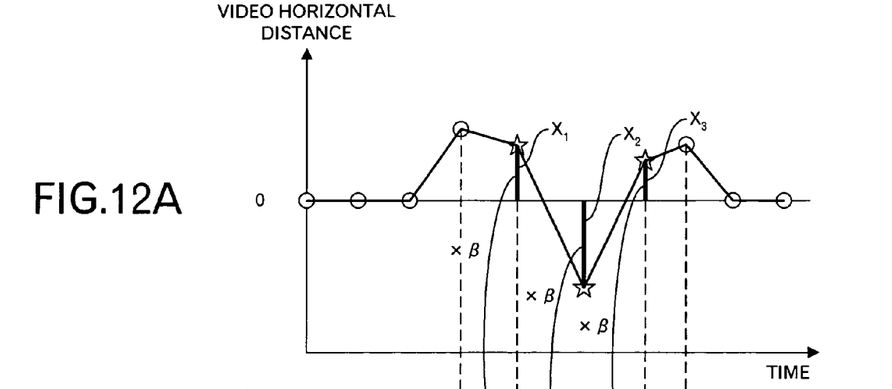
FIG. 12A and FIG. 12B are diagrams for explaining a correction scale factor β.
Figure 12B:
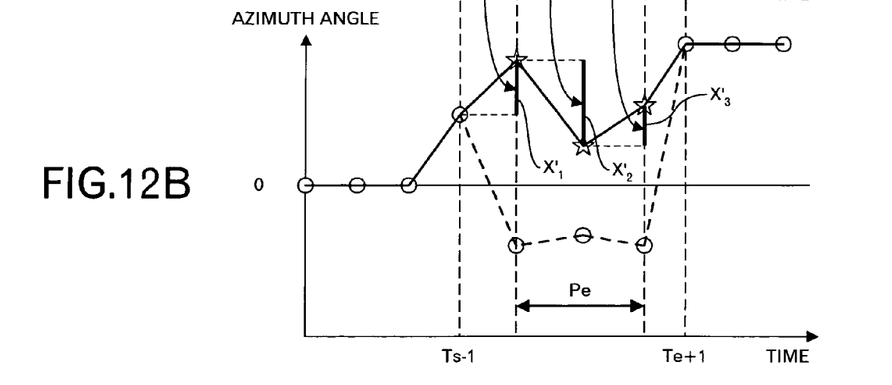

The correction models given by the expressions (2) to (4) will be described with reference to FIGS. 12A and 12B. Referring to FIG. 12A, there is shown the change of the video horizontal distance with respect to time, with the ordinate axis representing the video horizontal distances and the abscissa axis representing the time. It directly shows the data stored in the distance data storage 106. Referring to FIG. 12B, there is shown the change of the azimuth angle with respect to time, with the ordinate axis representing the azimuth angles and the abscissa axis representing the time. Here, when a value calculated by multiplying the video horizontal distances $X_1$, $X_2$, and $X_3$ in the error section Pe by the scale factor b and accumulating them becomes coincident with the difference between the azimuth angle C(Ts−1) immediately preceding the error section Pe and the azimuth angle C(Te+1) immediately following the error section Pe, |Q(b)|=0 is satisfied, and thereby the error section can be connected with the preceding and following sections most smoothly and completely. If b in such a case is calculated as β, the correction amounts of the azimuth angles are calculated by $X_1*\beta$, $X_2*\beta$, and $X_3*\beta$.

FIG. 12B shows the plots of output values of the electronic compass 1 along a dashed line in the error section. Without using these values, however, the previous azimuth angle value is corrected by the correction amount $X'_1$ (=$X_1*\beta$) at the first time point in the error section, the corrected azimuth angle value at the first time point is further corrected by the correction amount $X'_2$ (=$X_2*\beta$) at the second time point, and the corrected azimuth angle value at the second time point is further corrected by the correction amount $X'_3$ (=$X_3*\beta$) at the third time point. Thereby, as shown in FIG. 12B, the values each denoted by a star are calculated as corrected azimuth angles, whereby the error section is connected with the preceding and following sections smoothly.

Thereby, in comparison with the method of simply connecting appropriate sections linearly, because the correction is made according to the video motion, highly reliable correction more reflecting an actual situation is realized. Incidentally, similarly to the comparison scale factor α, the scale factor β may be calculated for sections including predetermined sections preceding and following the error section, though these predetermined sections are not included in the error section.

Figure 13:
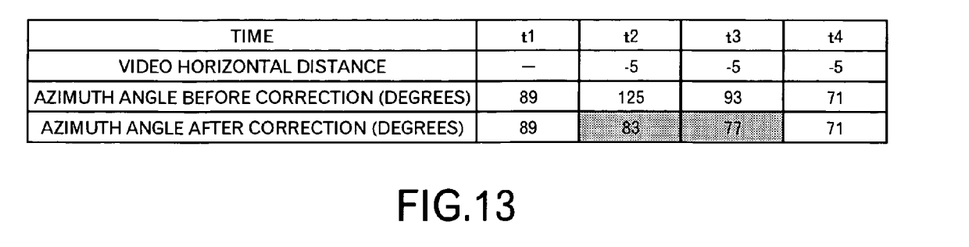
FIG. 13 is a diagram for explaining correction of an azimuth angle.
Figure 14:
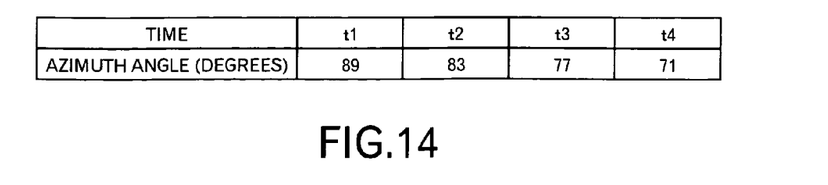
FIG. 14 is a diagram showing an example of data stored in a metadata storage.

Thereafter, as described above, the metadata corrector 108 calculates correction amounts by using the correction scale factor β and the video horizontal distance in the error section, which is stored in the distance data storage 106, corrects each azimuth angle value in the error section by using the correction amounts and the value preceding the error section stored in the tentative metadata storage 102, and stores the azimuth angle data after correction into the metadata storage 8 (step S17). For example, when it is assumed that β=1.2 is calculated in the step S15, the correction amount is calculated as −6 at the time t2 and the time t3 in the example shown in FIGS. 7 and 10. Therefore, as shown in FIG. 13, the azimuth angle after correction at the time t2 is found to be 83 from the azimuth angle 89 at the time t1 and the correction amount −6, and thereby the azimuth angle after correction at the time t3 is found to be 77. Moreover, the azimuth angle after correction at the time t4 is found to be 71 from the correction amount −6 and the azimuth angle 77 after correction, and the azimuth angle after correction at the time t4 is actually 71, too. Therefore, it is understood that they are smoothly corrected. In FIG. 13, the values in the hatched cells indicate corrected values. Ultimately, data as shown in FIG. 14 are stored into the metadata storage 8. Thereafter, the processing progresses to the step S19.

In the step S19, it is determined whether or not all error sections have already been processed. For example, if a plurality of error sections Pe exist in the time period to be processed, the control returns to the step S9 until all of the error sections to be processed are completed. After the completion of the processing of all of the error sections, this processing terminates.

Through the processing is described hereinabove, it becomes possible to judge whether metadata according to the video is successfully obtained. When the metadata not according to the video is successfully obtained, the metadata can be corrected properly so as to obtain the metadata according to the video.

While the preferred embodiment of the present invention has been described hereinabove, the present invention is not limited thereto. For example, the functional blocks shown in FIG. 1 and FIG. 3 do not necessarily correspond to program modules, devices, or components.

Moreover, the processing of the video metadata correction apparatus 100 can be executed in real time while obtaining video and sensor information. As an alternative embodiment, all data including errors recorded once as sensor information may be corrected with batch processing. Furthermore, information other than azimuth angles, such as, for example, position information can be corrected by smoothing through error detecting by determining validity from the difference of moving distance and a distance in the video. As described above, the present invention is a technique widely applicable to general sensors.

Moreover, the present invention is also applicable to a video metadata correction system for recording a position and an azimuth angle of a driving recorder in a car or a position and an azimuth angle for human navigation by a cellular phone with GPS functions.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A video metadata correction apparatus, comprising:
a first video metadata storage to store azimuth angles as sensor information synchronized with video;
a section identification unit to identify a section including incorrect azimuth angle based on azimuth angle difference calculated from said azimuth angles stored in said first video metadata storage and a horizontal distance extracted from said video, wherein said horizontal distance is a feature value corresponding to change of said video with respect to time and follows change of said azimuth angle difference with respect to time while said azimuth angles are correctly measured; and
a corrector to correct said azimuth angle in the identified section based on said horizontal distance or a second video feature value, which correlates with information concerning said azimuth angle and is extracted from said video, and store the corrected azimuth angle into a second video metadata storage.

2. The video metadata correction apparatus as set forth in claim 1,
wherein
said section identification unit comprises a unit to extract a candidate section including said incorrect azimuth angle based on said change of said azimuth angle difference with respect to time.

3. The video metadata correction apparatus as set forth in claim 1, wherein said section identification unit comprises a unit to judge whether or not a coefficient minimizing a function including a residual between said azimuth angle difference in a specific section and a product of said coefficient and said horizontal distance in said specific section is within a predetermined range.

4. The video metadata correction apparatus as set forth in claim 1, wherein said corrector comprises a unit to calculate a correction amount of said azimuth angle so as to be proportional to a change amount of said horizontal distance or the second video feature value.

5. The video metadata correction apparatus as set forth in claim 1, wherein said corrector comprises a unit to calculate a correction amount of said azimuth angle so as to smoothly change said azimuth angle according to a change amount of said horizontal distance or said second video feature value.

6. The video metadata correction apparatus as set forth in claim 1, wherein said corrector comprises a unit to calculate a correction amount of said azimuth angle so as to be proportional to a change amount of said horizontal distance or said second video feature value and continuously connect the identified section and its preceding and following sections or a correction section and its preceding and following sections, said correction section including the identified section and at least its preceding or following subsection.

7. A video metadata recording apparatus, comprising:
said video metadata correction apparatus as set forth in claim 1;
a video data storage that stores data of said video;
a camera that shoots said data of said video to store said data into said video data storage;
a sensor that obtains said sensor information and stores said sensor information into said first video metadata storage.

8. A terminal apparatus, comprising:
said video metadata correction apparatus as set forth in claim 1;
a video data storage that stores data of said video;
a map database that stores data of map elements at each position;
a unit that reads out video stored in said video data storage and said azimuth angle that is stored in said second video metadata storage and is synchronized with said video, searches said map database by said azimuth angle to read out data of a corresponding map element, and displays said data of said corresponding map element on a display device.

9. A video metadata correction method, comprising:
identifying a section including incorrect azimuth angle based on azimuth angle difference calculated from said azimuth angles stored in a first video metadata storage and a first horizontal distance extracted from a video, wherein said first video metadata storage stores said azimuth angles as sensor information synchronized with said video, and said horizontal distance is a feature value corresponding to change of said video with respect to time and follows change of said azimuth angle difference with respect to time while said azimuth angles are correctly measured;
correcting said azimuth angle in the identified section based on said horizontal distance or a second video feature value, which correlates with information concerning said azimuth angle and is extracted from said video; and
storing the corrected azimuth angle into a second video metadata storage.

10. A computer-readable storage medium storing a video metadata correction program, said video metadata correction program causing a computer to execute a process comprising:
identifying a section including incorrect azimuth angle based on azimuth angle difference calculated from said azimuth angles stored in a first video metadata storage and a first horizontal distance extracted from a video, wherein said first video metadata storage stores said azimuth angles as sensor information synchronized with said video, and said horizontal distance is a feature value corresponding to change of said video with respect to time and follows change of said azimuth angle difference with respect to time while said azimuth angles are correctly measured;
correcting said azimuth angle in the identified section based on said horizontal distance or a second video feature value, which correlates with information concerning said azimuth angle and is extracted from said video; and
storing the corrected azimuth angle into a second video metadata storage.

* * * * *